United States Patent
Suzuki

(10) Patent No.: US 12,436,453 B2
(45) Date of Patent: Oct. 7, 2025

(54) PROJECTOR

(71) Applicant: JVCKENWOOD CORPORATION, Yokohama (JP)

(72) Inventor: Tomohiko Suzuki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 377 days.

(21) Appl. No.: 18/207,323

(22) Filed: Jun. 8, 2023

(65) Prior Publication Data

US 2023/0324775 A1    Oct. 12, 2023

Related U.S. Application Data

(63) Continuation of application No. PCT/JP2021/039481, filed on Oct. 26, 2021.

(30) Foreign Application Priority Data

Dec. 16, 2020   (JP) ................................ 2020-208292

(51) Int. Cl.
   *G03B 21/14*   (2006.01)
(52) U.S. Cl.
   CPC ......... *G03B 21/142* (2013.01); *G03B 21/145* (2013.01); *G03B 21/14* (2013.01)
(58) Field of Classification Search
   CPC ..... G03B 21/142; G03B 21/14; G03B 21/145
   See application file for complete search history.

(56) References Cited

U.S. PATENT DOCUMENTS

| | | | | |
|---|---|---|---|---|
| 5,895,110 A | * | 4/1999 | Okada | H04N 5/7441 348/E5.143 |
| 6,113,240 A | * | 9/2000 | Iizuka | G03B 21/142 348/766 |
| 6,364,491 B1 | * | 4/2002 | Okada | H04N 9/3141 348/E5.143 |
| 6,416,184 B1 | * | 7/2002 | Arai | G03B 21/16 349/5 |
| 6,592,228 B1 | * | 7/2003 | Kawashima | G03B 21/11 353/69 |
| 2004/0080836 A1 | * | 4/2004 | Miyashita | G02B 7/023 359/805 |
| 2004/0114115 A1 | * | 6/2004 | Runco | G02B 7/023 348/E5.142 |
| 2005/0024596 A1 | * | 2/2005 | Kuroda | G03B 5/04 353/34 |
| 2005/0030491 A1 | * | 2/2005 | Gishi | G02B 7/023 353/101 |

(Continued)

FOREIGN PATENT DOCUMENTS

JP    2005173460 A    6/2005

*Primary Examiner* — Bao-Luan Q Le
(74) *Attorney, Agent, or Firm* — Nath, Goldberg & Meyer; Jerald L. Meyer

(57) ABSTRACT

A shift tolerance is defined as a range in which a projection lens can be displaced in any direction without causing vignetting of image light projected by the projection lens. A shift allowance plate has an opening that is similar in shape to the shift tolerance and has a size equal to or smaller than the shift tolerance, and has a through hole. When the projection lens displaces in any direction and displaces the shift allowance plate, a light receiving part receives light, and a detector detects that the projection lens has been displaced to a limit position.

2 Claims, 15 Drawing Sheets

(56) References Cited

U.S. PATENT DOCUMENTS

| | | | |
|---|---|---|---|
| 2005/0030492 A1* | 2/2005 | Gishi | H04N 9/3141 348/E5.143 |
| 2005/0083585 A1* | 4/2005 | Lin | G02B 7/023 359/694 |
| 2007/0052935 A1* | 3/2007 | Nakamura | G03B 5/02 353/101 |
| 2007/0132961 A1* | 6/2007 | Kuroki | G03B 21/145 353/31 |
| 2007/0133109 A1* | 6/2007 | Kuroki | G03B 21/142 353/100 |
| 2008/0080069 A1* | 4/2008 | Masuda | G02B 7/023 359/813 |
| 2009/0002645 A1* | 1/2009 | Lee | G03B 3/00 353/101 |
| 2009/0040479 A1* | 2/2009 | Liao | G03B 5/02 353/101 |
| 2009/0185145 A1* | 7/2009 | Kitahara | G03B 21/005 353/101 |
| 2009/0219505 A1* | 9/2009 | Kitahara | G03B 27/62 355/75 |
| 2010/0045945 A1* | 2/2010 | Tseng | G02B 7/08 353/101 |
| 2010/0202067 A1* | 8/2010 | Chen | F16M 11/18 359/822 |
| 2011/0001940 A1* | 1/2011 | Kuroda | G03B 21/142 359/813 |
| 2011/0090471 A1* | 4/2011 | Fujisaki | G03B 5/04 359/813 |
| 2011/0090578 A1* | 4/2011 | Yoshimura | G03B 5/04 359/811 |
| 2011/0310364 A1* | 12/2011 | Wakabayashi | G03B 21/142 353/121 |
| 2012/0218527 A1* | 8/2012 | Hatakeyama | G03B 21/54 353/101 |
| 2012/0229771 A1* | 9/2012 | Hashimoto | G02B 7/004 353/7 |
| 2012/0285280 A1* | 11/2012 | Chang | F16M 11/046 74/411 |
| 2012/0293778 A1* | 11/2012 | Furuichi | G03B 21/147 353/101 |
| 2013/0003027 A1* | 1/2013 | Yang | H04N 9/3194 353/121 |
| 2013/0208250 A1* | 8/2013 | Fujisaki | G03B 21/142 359/813 |
| 2013/0342923 A1* | 12/2013 | Itou | G02B 7/14 359/811 |
| 2014/0092370 A1* | 4/2014 | Nemura | G03B 21/142 353/101 |
| 2014/0092371 A1* | 4/2014 | Nemura | G02B 7/023 353/101 |
| 2014/0253818 A1* | 9/2014 | Ono | H04N 5/7416 348/744 |
| 2015/0268539 A1* | 9/2015 | Sakai | G03B 21/142 353/101 |
| 2017/0010522 A1* | 1/2017 | Shen | G02B 7/023 |
| 2018/0088449 A1* | 3/2018 | Hatano | G03B 21/147 |
| 2018/0143520 A1* | 5/2018 | Ishijima | G03B 21/2033 |
| 2018/0314138 A1* | 11/2018 | Inui | G02B 7/023 |
| 2019/0129286 A1* | 5/2019 | Lin | G02B 27/0955 |
| 2020/0057240 A1* | 2/2020 | Yu | G03B 21/145 |
| 2020/0150515 A1* | 5/2020 | Sakamoto | G03B 21/145 |
| 2021/0240062 A1* | 8/2021 | Hirasawa | G02B 7/005 |
| 2022/0026786 A1* | 1/2022 | Ahn | G03B 21/142 |
| 2022/0365409 A1* | 11/2022 | Zhou | G03B 21/145 |

* cited by examiner

PROJECTOR

CROSS REFERENCE TO RELATED APPLICATION

This application is a continuation of PCT Application No. PCT/JP2021/039481, filed on Oct. 26, 2021, and claims the priority of Japanese Patent Application No. 2020-208292, filed on Dec. 16, 2020, the entire contents of both of which are incorporated herein by reference.

BACKGROUND

The present disclosure relates to a projector with a lens shift function.

A projector may be equipped with a lens shift function that displaces a projection lens horizontally and vertically in order to displace a position for projecting image light. In a projector equipped with a lens shift function, vignetting occurs in projected image light when the projection lens is displaced beyond the horizontal or vertical displacement limit position. Therefore, it is necessary for the projector to displace the projection lens within a range that does not exceed the horizontal and vertical displacement limit positions (see Japanese Unexamined Patent Application Publication No. 2005-173460).

SUMMARY

A projector may be equipped with a configuration that uses a pulse motor as a drive source for displacing a projection lens, and displaces the projection lens within a range that does not exceed the limit position for horizontal or vertical displacement based on the pulse count of the pulse motor. However, in this configuration, if the pulse motor loses synchronism due to some problem, an accurate position of the projection lens cannot be detected, and the projection lens may be displaced beyond a limit position.

An aspect of one or more embodiments provides a projector including: a display element; a projection lens configured to project image light based on an image displayed on the display element; a horizontal stage having a first opening into which the projection lens is fitted, and being horizontally movable for horizontally displacing the projection lens fitted in the first opening; a vertical stage having a second opening into which the projection lens is fitted, and being vertically movable for vertically displacing the projection lens fitted in the second opening; a photosensor including a light emitting part and a light receiving part; a shift allowance plate having a third opening that is similar in shape to a shift tolerance of the projection lens and has a size equal to or smaller than the shift tolerance, and having a through hole that allows light emitted from the light emitting part to pass through, the shift tolerance being defined as a range in which the projection lens can be displaced in either a horizontal direction or a vertical direction, or in any direction combining horizontal and vertical directions, without causing vignetting of the image light projected by the projection lens.

In the above projector, the projection lens is arranged in the third opening, in a state in which the projection lens is not displaced, an entire circumference of an outer surface of the projection lens is not in contact with the shift allowance plate at an end of the third opening, and the light emitting part faces the through hole. The projector further includes a detector configured to detect that the projection lens has been displaced to a limit position, based on a change from a state in which the light receiving part does not receive light emitted from the light emitting part to a state in which the light receiving part receives light emitted from the light emitting part, or a change from a state in which the light receiving part receives light emitted from the light emitting part to a state in which the light receiving part does not receive light emitted from the light emitting part, when at least one of the horizontal stage and the vertical stage is moved to displace the projection lens in any direction and the outer surface of the projection lens is in contact with the shift allowance plate at the end of the third opening to displace the shift allowance plate.

DETAILED DESCRIPTION

Figure 1:
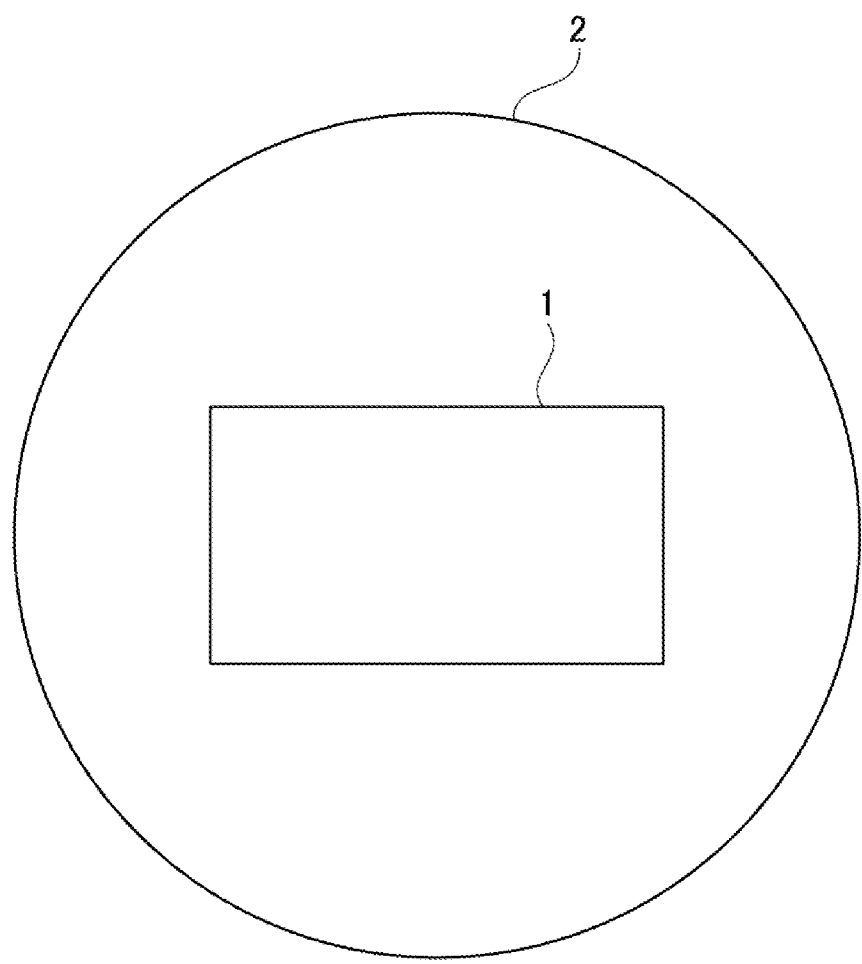
FIG. 1 is a diagram illustrating the relationship between a display element in a projector and an effective image circle of a projection lens.

Hereinafter, a projector according to one or more embodiments will be described with reference to the accompanying drawings. As shown in FIG. 1, the projector includes a display element 1, which is a liquid crystal display element, for example. The display element 1 may be a reflective liquid crystal display element referred to as liquid crystal on silicon (LCOS) device. As will be described later, the projector includes a projection lens for projecting image light that is based on the image displayed on the display element 1 onto a screen or the like. FIG. 1 shows the relationship between the display element 1 and the effective image circle 2 of the projection lens. If the projection lens is displaced in a horizontal or vertical direction and the effective image circle 2 moves out of the display element 1, vignetting will occur in the projected image light.

Figure 2:
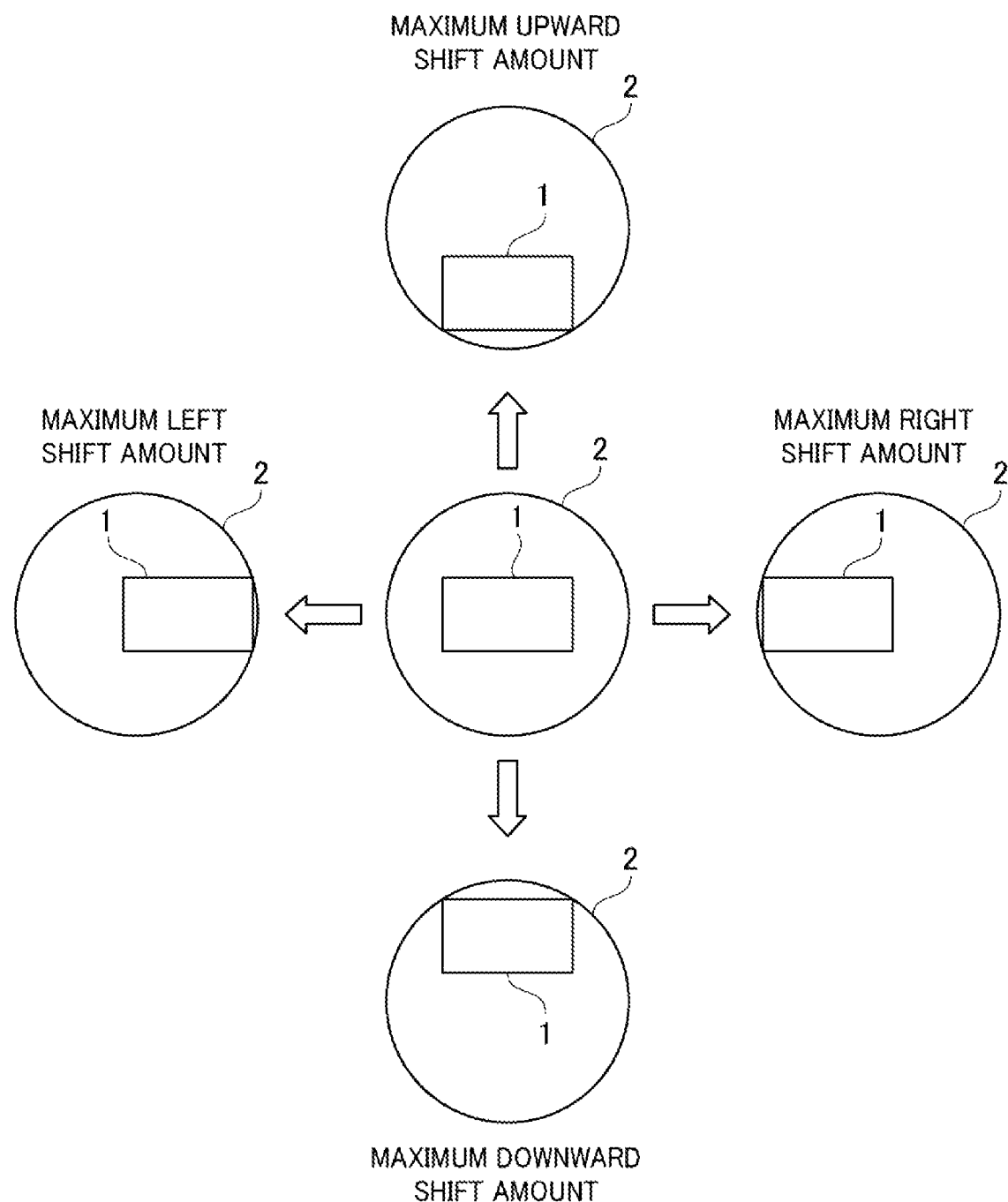
FIG. 2 is a diagram illustrating states in which the effective image circle is displaced by the maximum shift amount in a horizontal direction and states in which the effective image circle is displaced by the maximum shift amount in a vertical direction, from the state in which the display element is located in the center of the effective image circle of the projection lens.

FIG. 2 shows states in which the effective image circle 2 is displaced by the maximum shift amount in a horizontal direction (right and left directions) and states in which the effective image circle 2 is displaced by the maximum shift amount in a vertical direction (up and down directions), from the state in which the display element 1 is located in the center of the effective image circle 2 of the projection lens. When displacing the projection lens only in a horizontal direction, the projector can displace the projection lens in the horizontal direction within a range from the maximum left shift amount to the maximum right shift amount. When displacing the projection lens only in a vertical direction, the projector can displace the projection lens in the vertical direction within a range from the maximum upward shift amount to the maximum downward shift amount.

Figure 3:
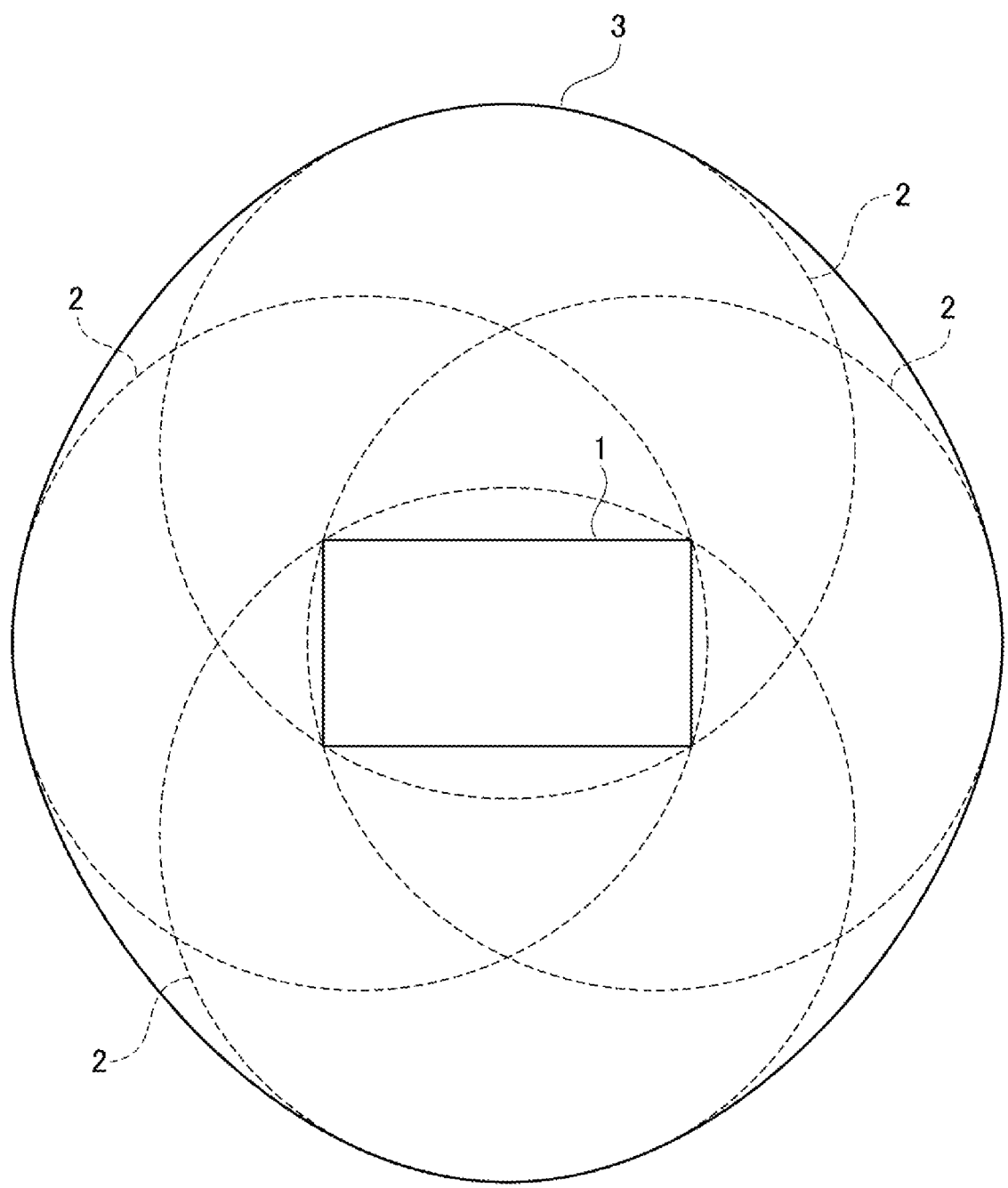
FIG. 3 is a diagram illustrating a shift tolerance in all directions around the display element of the effective image circle.

FIG. 3 shows the shift tolerance 3 in all directions around the display element 1 of the effective image circle 2. The shift tolerance 3 shown in FIG. 3 is the range in which the projection lens can be displaced when the projection lens is displaced in either a horizontal or vertical direction, or in any direction combining horizontal and vertical directions, without causing vignetting in the projected image light. The shift tolerance 3 has the shape shown in FIG. 3.

Figure 4:
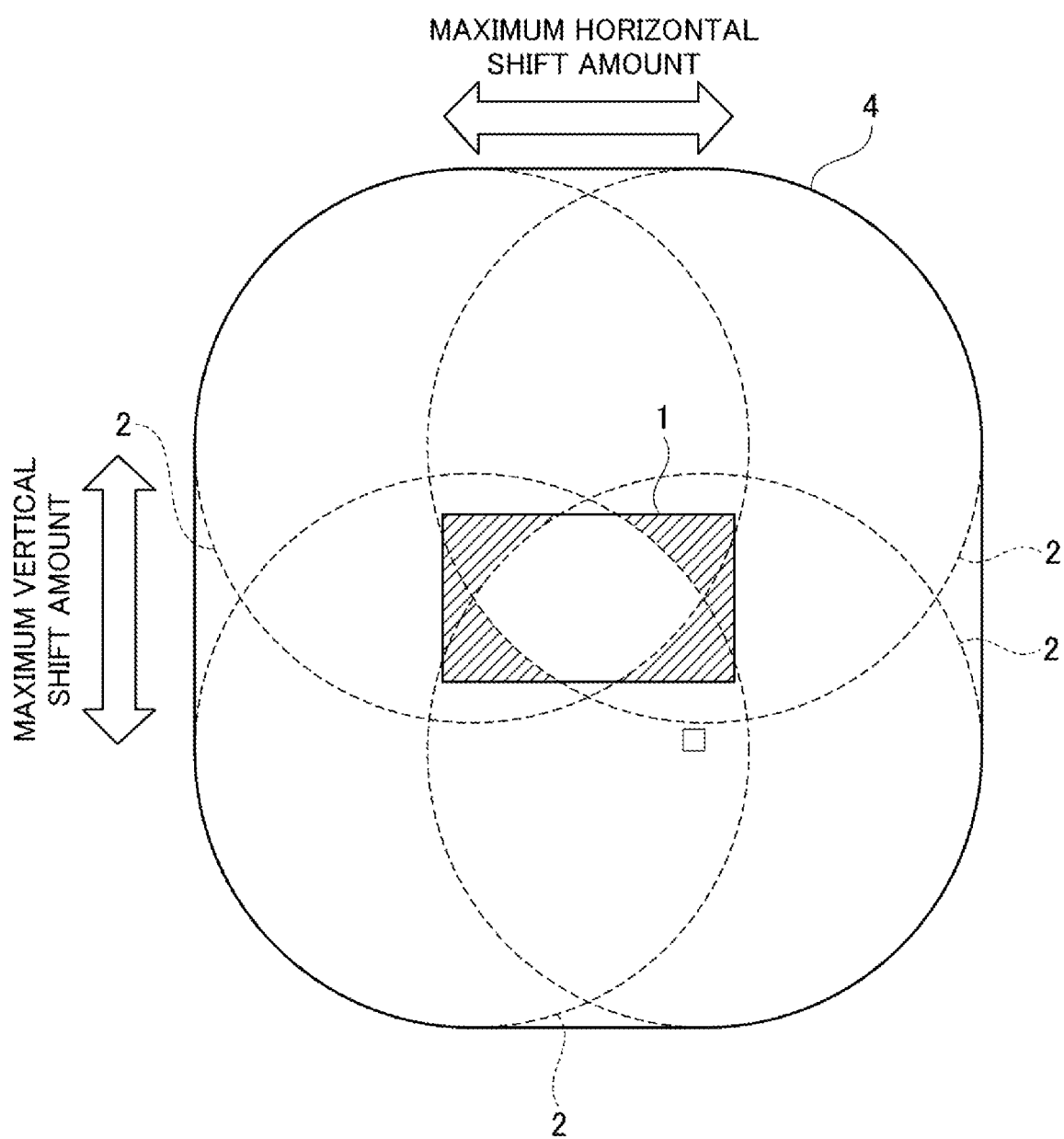
FIG. 4 is a diagram illustrating vignetting that occurs when the effective image circle is displaced by the maximum shift amount in a horizontal direction without considering the vertical shift amount, and the effective image circle is displaced by the maximum shift amount in a vertical direction without considering the horizontal shift amount.

Suppose that the projector is equipped with a sensor that detects that the projection lens has been displaced to the maximum left shift amount, a sensor that detects that it has been displaced to the maximum right shift amount, a sensor that detects that it has been displaced to the maximum top shift amount, and a sensor that detects that it has been displaced to the maximum bottom shift amount. Then, as shown in FIG. 4, without considering the vertical shift amount, the projector can horizontally displace the projection lens by the maximum horizontal shift amount. Also, without considering the horizontal shift amount, the projector can vertically displace the projection lens by the maximum vertical shift amount.

However, when the projection lens is displaced within the range shown in FIG. 4, the effective image circle 2 may deviate from the display element 1, as indicated by the hatching added to the right and left ends of the display element 1. Therefore, the configuration in which the projector is equipped with the above four sensors for the top, bottom, right, and left cannot prevent the occurrence of vignetting in the image light.

Referring to FIGS. 5 through 19, a configuration for displacing the projection lens within a range of the horizontal or vertical displacement limit positions employed by the projector according to one or more embodiments will be described. The projector according to one or more embodiments does not employ a configuration in which the projection lens is displaced within a range not exceeding the horizontal or vertical displacement limit positions based on the number of pulses of the pulse motor. The projector according to one or more embodiments does not employ a configuration that uses four sensors for the top, bottom, right, and left.

Figure 5:
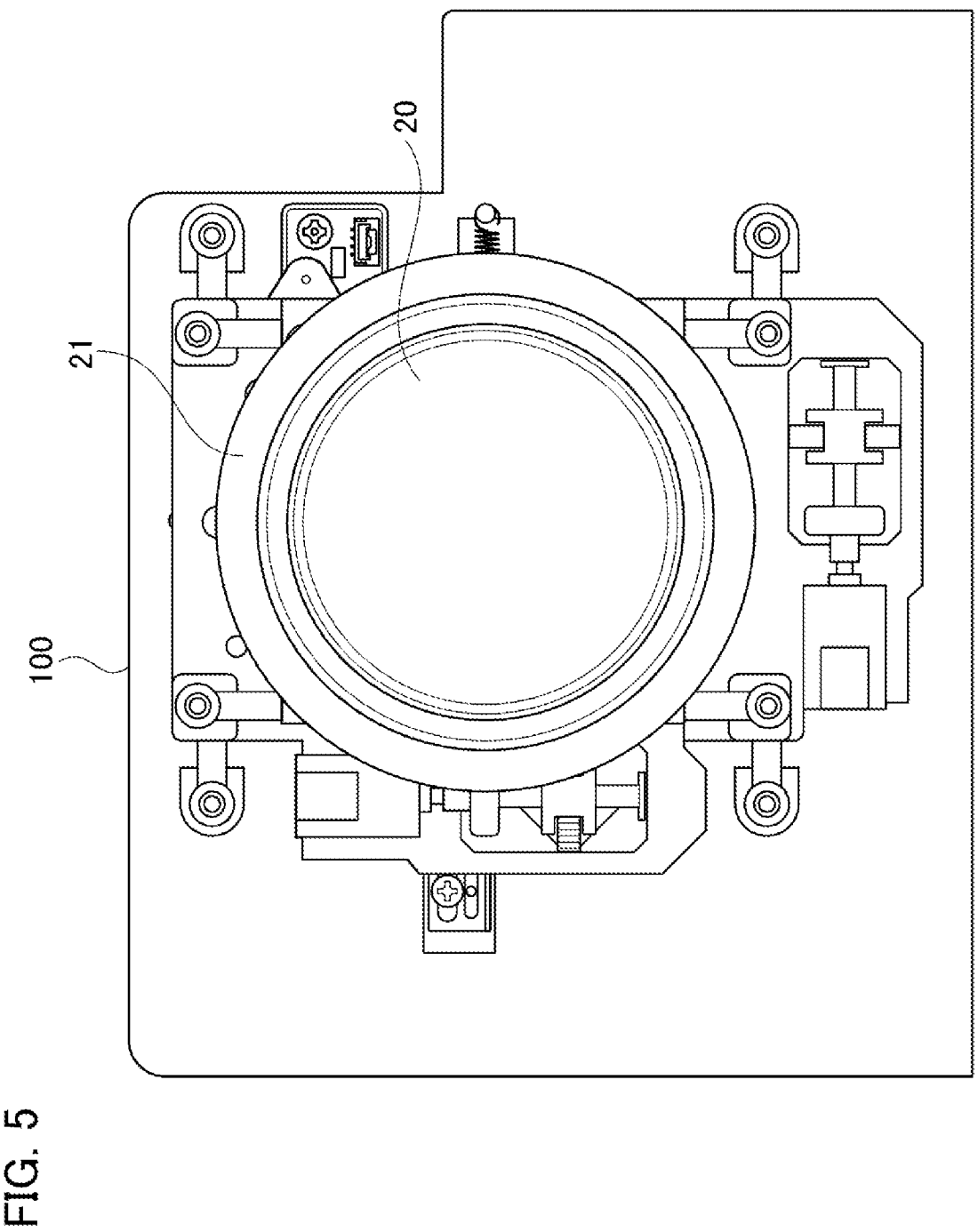
FIG. 5 is a plan view illustrating a state in which various parts including a projection lens and a mask member are attached to a base.

FIG. 5 shows a state in which a projection lens 20 is indirectly attached to a base 100, which is part of the housing of the projector. FIG. 5 and the subsequent figures including the base 100 show the state of each component viewed from the front of the base 100, which is the interior of the housing (the state of the interior viewed from the outside of the housing). An annular mask member 21 is mounted around the projection lens 20 to prevent unwanted light from leaking out from the outer periphery of the projection lens 20.

Figure 6:
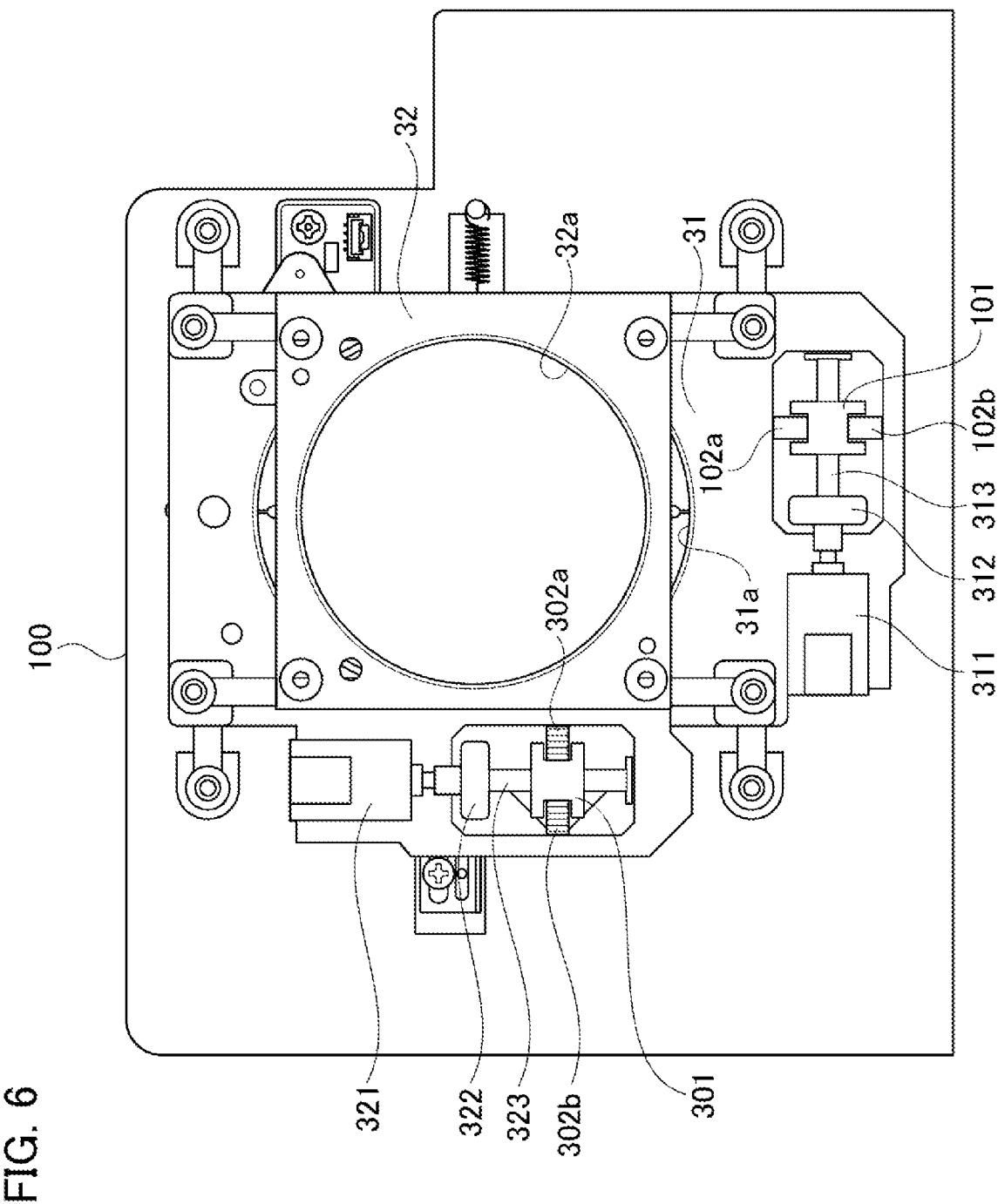
FIG. 6 is a plan view illustrating a state in which the projection lens and the mask member in FIG. 5 are removed, and various parts including a horizontal stage and a vertical stage for displacing the projection lens are attached to the base.

FIG. 6 shows a state in which the projection lens 20 and the mask member 21 in FIG. 5 are removed. As shown in FIG. 6, the projector includes a horizontal stage 31 that is movable horizontally for horizontally displacing the projection lens 20, and a vertical stage 32 that is movable vertically for vertically displacing the projection lens 20.

The horizontal stage 31 has an oval opening 31a (first opening), and the vertical stage 32 has a circular opening 32a (second opening). The projection lens 20 is fitted into the openings 31a and 32a.

A lead nut 101 is fixed to the base 100 by a pair of claws 102a and 102b provided on the base 100. A horizontal shift motor 311 for driving the horizontal stage 31 is attached to the horizontal stage 31. The horizontal shift motor 311 is a pulse motor.

The rotation of the horizontal shift motor 311 is transmitted via a gear 312 to a lead screw 313 that meshes with the lead nut 101. The lead screw 313 is mounted on the horizontal stage 31. Therefore, when the horizontal shift motor 311 rotates, the entirety of the horizontal stage 31, the horizontal shift motor 311, the gear 312, and the lead screw 313 move in a horizontal direction (right or left direction). The horizontal stage 31 moves along horizontal rails provided on the base 100.

Since the vertical stage 32 is attached to the horizontal stage 31, the horizontal stage 31 moves integrally with the vertical stage 32.

A lead nut 301 is fixed to the horizontal stage 31 by a pair of claws 302a and 302b provided on the horizontal stage 31. A vertical shift motor 321 for driving the vertical stage 32 is attached to the vertical stage 32. The vertical shift motor 321 is a pulse motor.

The rotation of the vertical shift motor 321 is transmitted via a gear 322 to a lead screw 323 that meshes with the lead nut 301. The lead screw 323 is mounted on the vertical stage 32. Therefore, when the vertical shift motor 321 rotates, the entirety of the vertical stage 32, the vertical shift motor 321, the gear 322, and the lead screw 323 move in a vertical direction (up or down direction). The vertical stage 32 moves along vertical rails provided on the horizontal stage 31.

Figure 7:
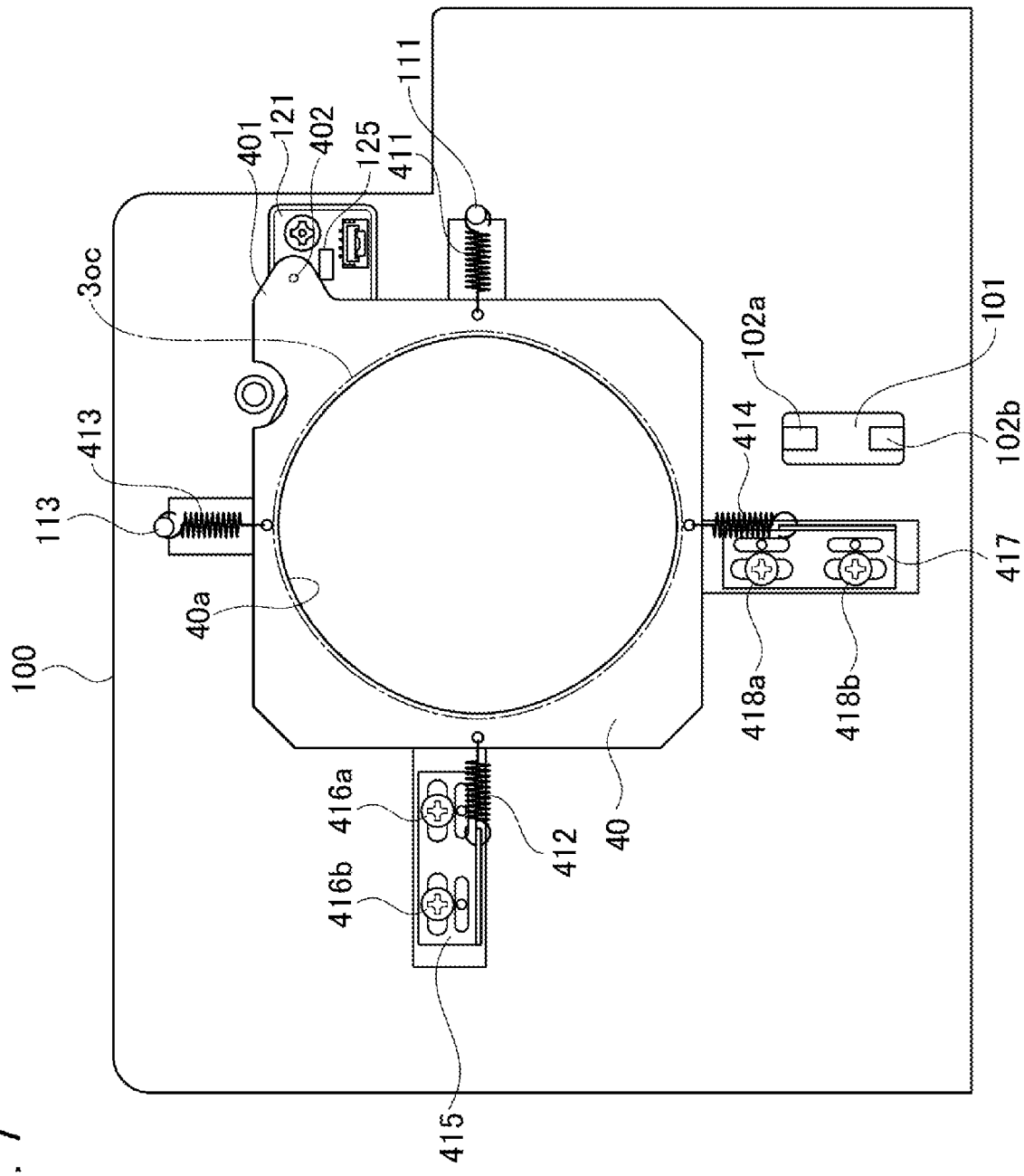
FIG. 7 is a plan view illustrating a state in which the horizontal stage and the vertical stage in FIG. 6 are removed, and a shift allowance plate is attached to the base.

FIG. 7 shows a state in which the horizontal stage 31, the horizontal shift motor 311, the gear 312, the lead screw 313, the vertical stage 32, the vertical shift motor 321, the gear 322, the lead screw 323, and the lead nut 301 in FIG. 6 are removed. As shown in FIG. 7, the projector includes a shift allowance plate 40.

The shift allowance plate 40 has an opening 40a (third opening) similar in shape to the shift tolerance 3 shown in FIG. 3. The opening 40a is set slightly smaller than the outline 3oc of the shift tolerance 3 indicated by a one-dot chain line. The size of the opening 40a is larger than the cross-sectional area of the projection lens 20 at the position of the shift allowance plate 40. Therefore, the projection lens 20 is arranged in the opening 40a without making contact with the shift allowance plate 40.

Taking the case where the diameter of the projection lens 20 is 40 mm to 50 mm as an example, the end of the opening 40a may be positioned at a distance of about 1 mm inward from the outline 3oc. The size of the opening 40a having a shape similar to that of the shift tolerance 3 may be equal to or smaller than the shift tolerance 3, preferably the same size or slightly smaller. How small the opening 40a should be relative to the shift tolerance 3 is a design matter.

In FIG. 7, the right end of the shift allowance plate 40 and a cylindrical pin 111 provided on the base 100 are connected by a spring 411. The left end of the shift allowance plate 40 and a spring position adjustment part 415 are connected by a spring 412. The spring position adjustment part 415 is secured to the base 100 with a pair of screws 416a and 416b. The spring position adjustment part 415 can be adjusted in position to be fixed to the base 100 by loosening the screws 416a and 416b and sliding it in the right and left directions.

The upper end of the shift allowance plate 40 is connected to the cylindrical pin 113 on the base 100 by a spring 413. The lower end of the shift allowance plate 40 is connected to a spring position adjustment part 417 by a spring 414. The spring position adjustment part 417 is secured to the base 100 with a pair of screws 418a and 418b. The spring position adjusting part 417 can be adjusted in position to be fixed to the base 100 by loosening the screws 418a and 418b and sliding it vertically.

The mounting position of the shift allowance plate 40 with respect to the base 100 is adjusted by adjusting the positions of the spring position adjusting parts 415 and 417 with respect to the base 100. The shift allowance plate 40 can be vertically and horizontally displaced by a predetermined amount by means of springs 411-414.

A protrusion 401 is formed in the upper right corner of the shift allowance plate 40. The position of the protrusion 401 is not limited. A through hole 402 is formed in the protrusion 401. A substrate 121 is attached to the base 100 so as to face the protrusion 401. The role of the through holes 402 will be described later.

Figure 8:
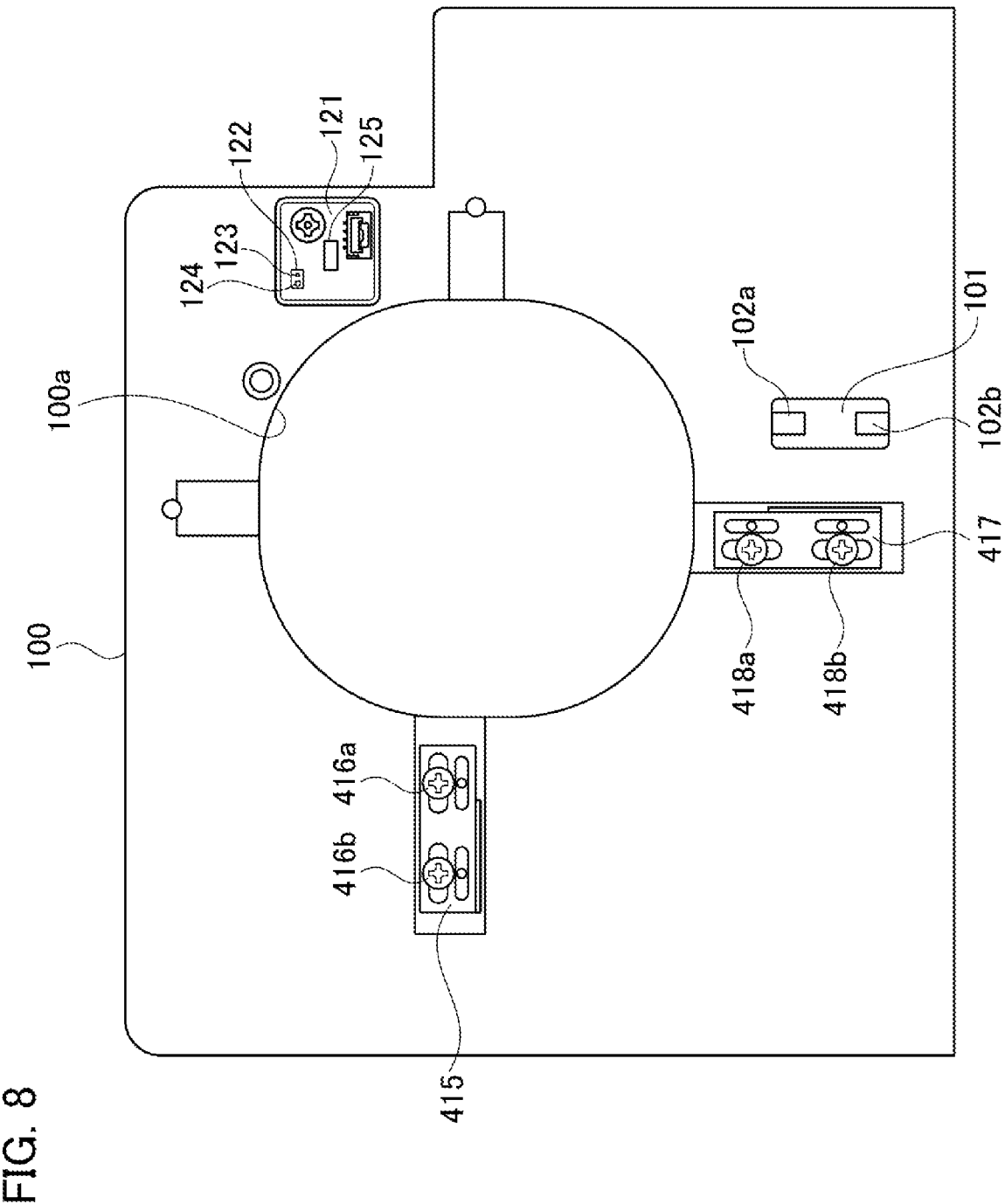
FIG. 8 is a plan view illustrating a state in which the shift allowance plate in FIG. 7 is removed.

FIG. 8 shows a state in which the shift allowance plate 40 and the springs 411-414 in FIG. 7 are removed. As shown in FIG. 8, the base 100 is formed with an opening 100a having a square shape with rounded corners. The image light emitted from the projection lens 20 is projected onto a screen or the like through the opening 100a.

The substrate 121 is attached to the base 100 in proximity to the end of the opening 100a. A photoreflector 122, which is an example of a photosensor, and a detector 125 are mounted on the substrate 121. The photoreflector 122 includes a light emitting part 123 and a light receiving part 124. As an example, the light emitting part 123 is an LED and the light receiving part 124 is a phototransistor.

Figure 9:
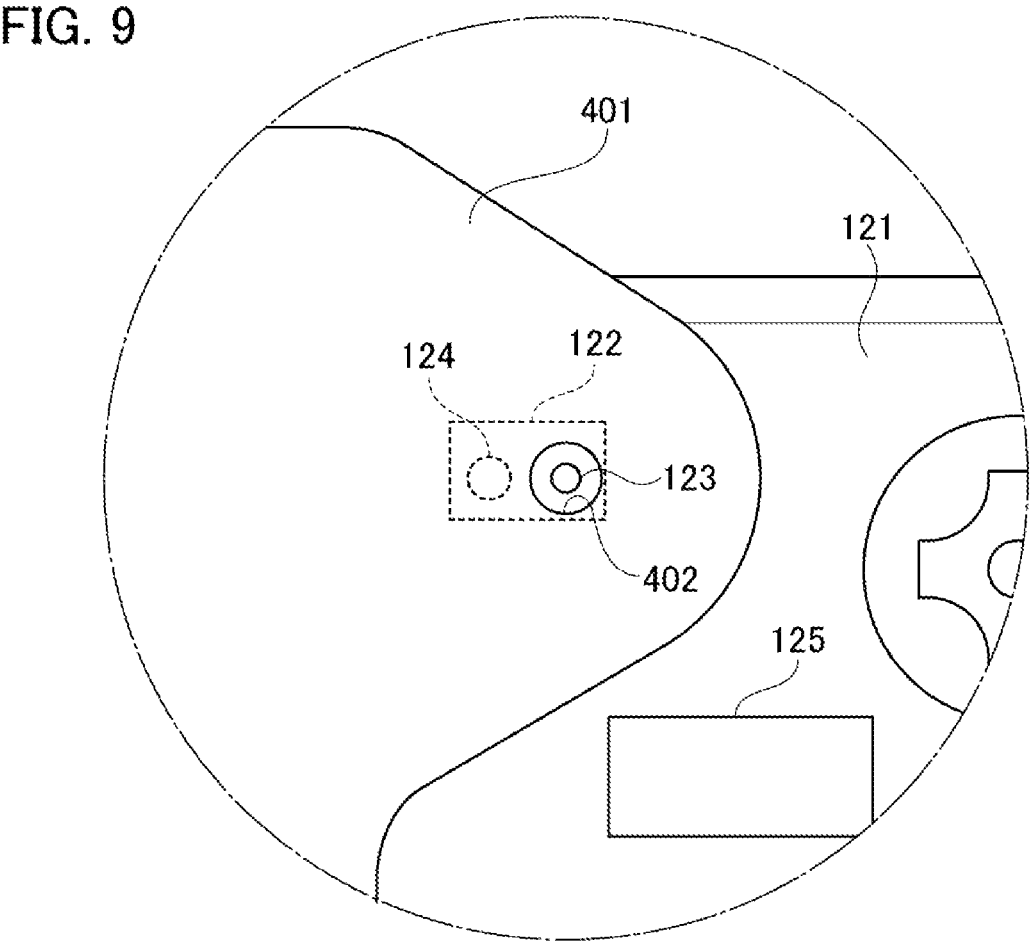
FIG. 9 is a partial enlarged plan view illustrating the positional relationship between a light emitting part and a through hole formed in the shift allowance plate when the projection lens is not displaced.

FIG. 9 is a partial enlarged plan view of the vicinity of the protrusion 401 in FIG. 7 in a state in which the projection lens 20 is not displaced in any direction. In this state, the light emitting part 123 faces exactly the through hole 402. It is desirable that the center of the light emitting part 123 and the center of the through hole 402 match.

Figure 10A:
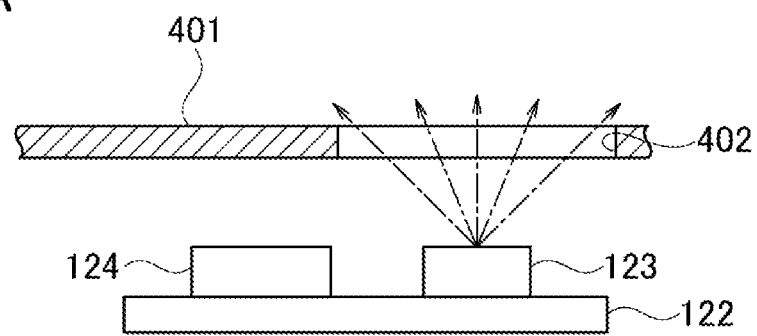
FIG. 10A is a diagram illustrating that a light receiving part does not receive the light emitted from the light emitting part in a state in which the light emitting part faces the through hole.
Figure 10B:
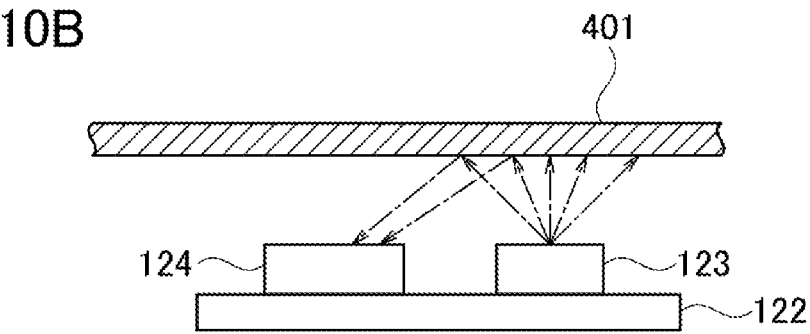
FIG. 10B is a diagram illustrating that the light receiving part receives the light emitted from the light emitting part in a state in which the light emitting part does not face the through hole.

As shown in FIG. 10A, in a state in which the light emitting part 123 faces the through hole 402, the light emitted from the light emitting part 123 passes through the through hole 402. Therefore, the light receiving part 124 does not receive the light emitted from the light emitting part 123. If the shift allowance plate 40 is displaced in any direction, the position of the through hole 402 shifts, so the light emitting part 123 does not face the through hole 402. As shown in FIG. 10B, when a portion of the protrusion 401 other than the through hole 402 faces the light emitting part 123, the light emitted from the light emitting part 123 is reflected by the protrusion 401. Therefore, the light receiving part 124 receives the light emitted from the light emitting part 123.

That is, when the light receiving part 124 receives the light emitted from the light emitting part 123, and a current of a predetermined value or more is supplied from the light receiving part 124 to the detector 125, the detector 125 detects that the shift allowance plate 40 has been displaced to the limit position in any direction based on the change of the light receiving part 124 from the state of not receiving the light to the state of receiving the light. The detector 125 may be mounted outside of the substrate 121. The detector 125 can be composed of a voltage detector. The detector 125 may be composed of a microprocessor.

Figure 11:
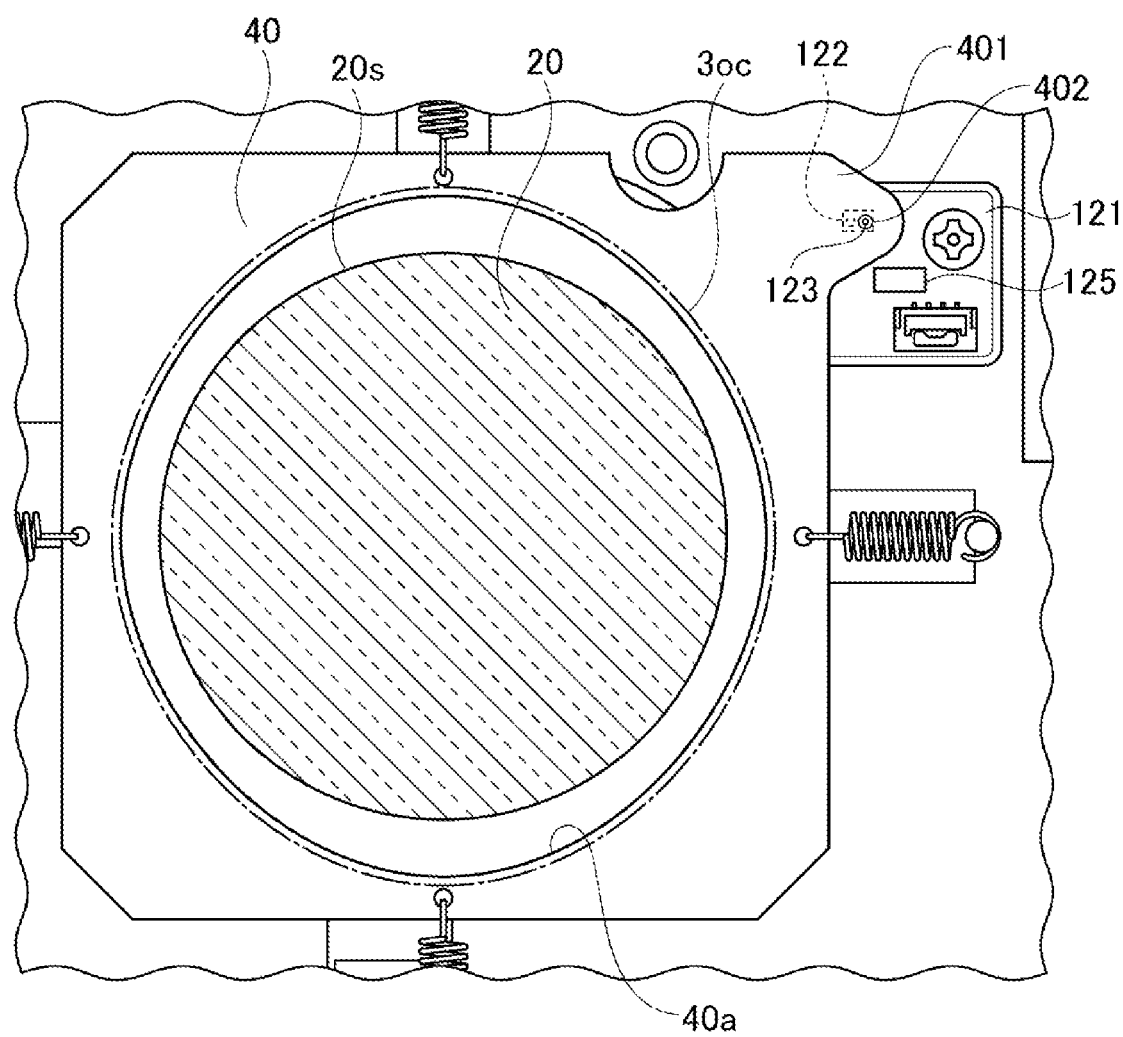
FIG. 11 is a partial plan view illustrating the positional relationship between the projection lens and an opening in a state in which the projection lens is not displaced.

FIGS. 11 to 19 describe how the detector 125 detects that the projection lens 20 has been displaced to the limit position when the projection lens 20 is displaced. In a state in which an unillustrated controller does not displace the projection lens 20 in any direction, the center of the projection lens 20 coincides with the center of the opening 40a, as shown in FIG. 11. In this state, the entire circumference of the outer surface 20s of the projection lens 20 is separated from the shift allowance plate 40 by a predetermined distance at the end of the opening 40a, and is not in contact with the shift allowance plate 40.

Figure 12:
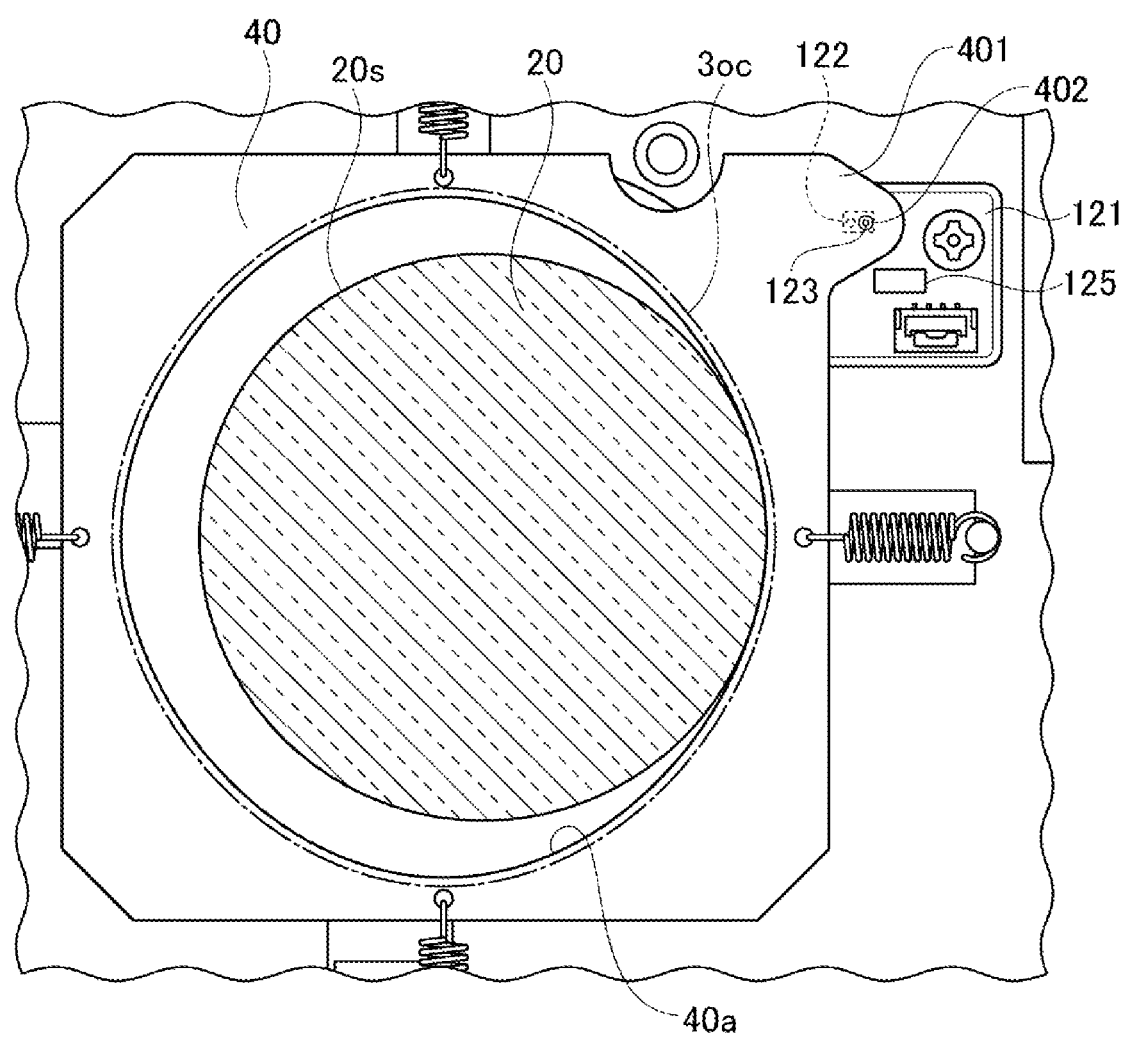
FIG. 12 is a partial plan view illustrating a state in which the projection lens is displaced rightward, and the outer surface of the projection lens comes into contact with the shift allowance plate at the right end of the opening.

Assume that the controller rotates the horizontal shift motor 311 to move the horizontal stage 31 rightward in order to displace the projection lens 20 rightward. Then, as shown in FIG. 12, the outer surface 20s of the projection lens 20 comes into contact with the shift allowance plate 40 at the right end of the opening 40a. In this state, since the opening 40a is slightly smaller than the outline 3oc of the shift tolerance 3, the projection lens 20 is not displaced to the limit position in the right direction. At this time, the light emitting part 123 faces the through hole 402.

Figure 13:
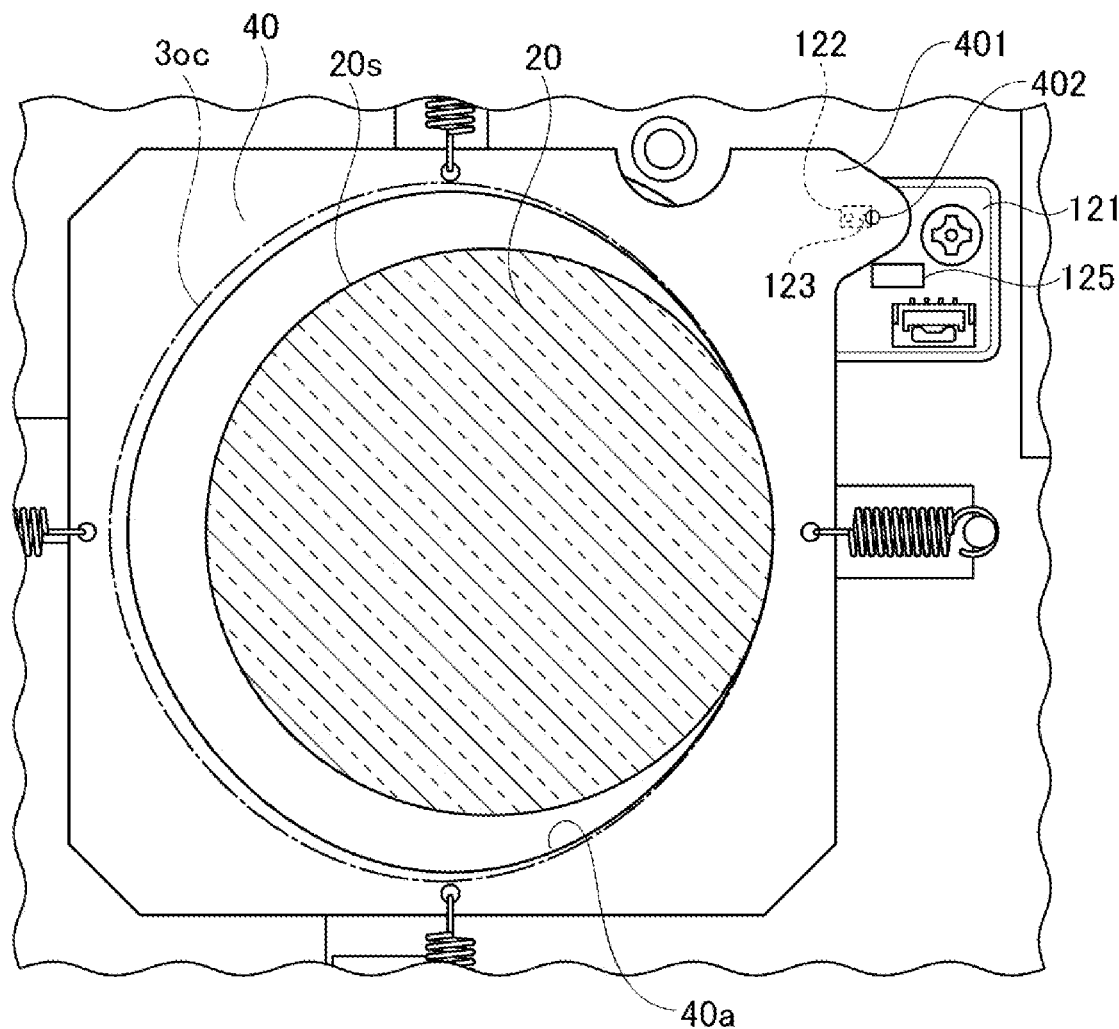
FIG. 13 is a partial plan view illustrating a state in which the projection lens displaced rightward pushes and displaces the shift allowance plate in the rightward direction.
Figure 14:
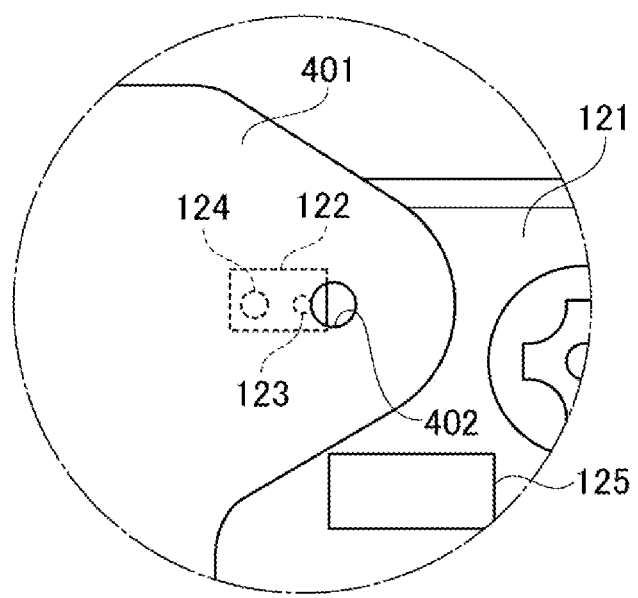
FIG. 14 is a partial enlarged plan view illustrating the positional relationship between the light emitting part and the through hole in the state of FIG. 13.

When the controller further rotates the horizontal shift motor 311 to move the horizontal stage 31 further rightward, the projection lens 20 pushes and displaces the shift allowance plate 40 to the right, as shown in FIG. 13. Then, as shown in the partial enlarged plan view of FIG. 14, the through hole 402 is shifted to the right side of the light emitting part 123, and the light receiving part 124 receives the light emitted from the light emitting part 123. The detector 125 detects that the shift allowance plate 40 has been displaced to the limit position in any direction by being supplied with a current equal to or greater than the predetermined value from the light receiving part 124.

Figure 15:
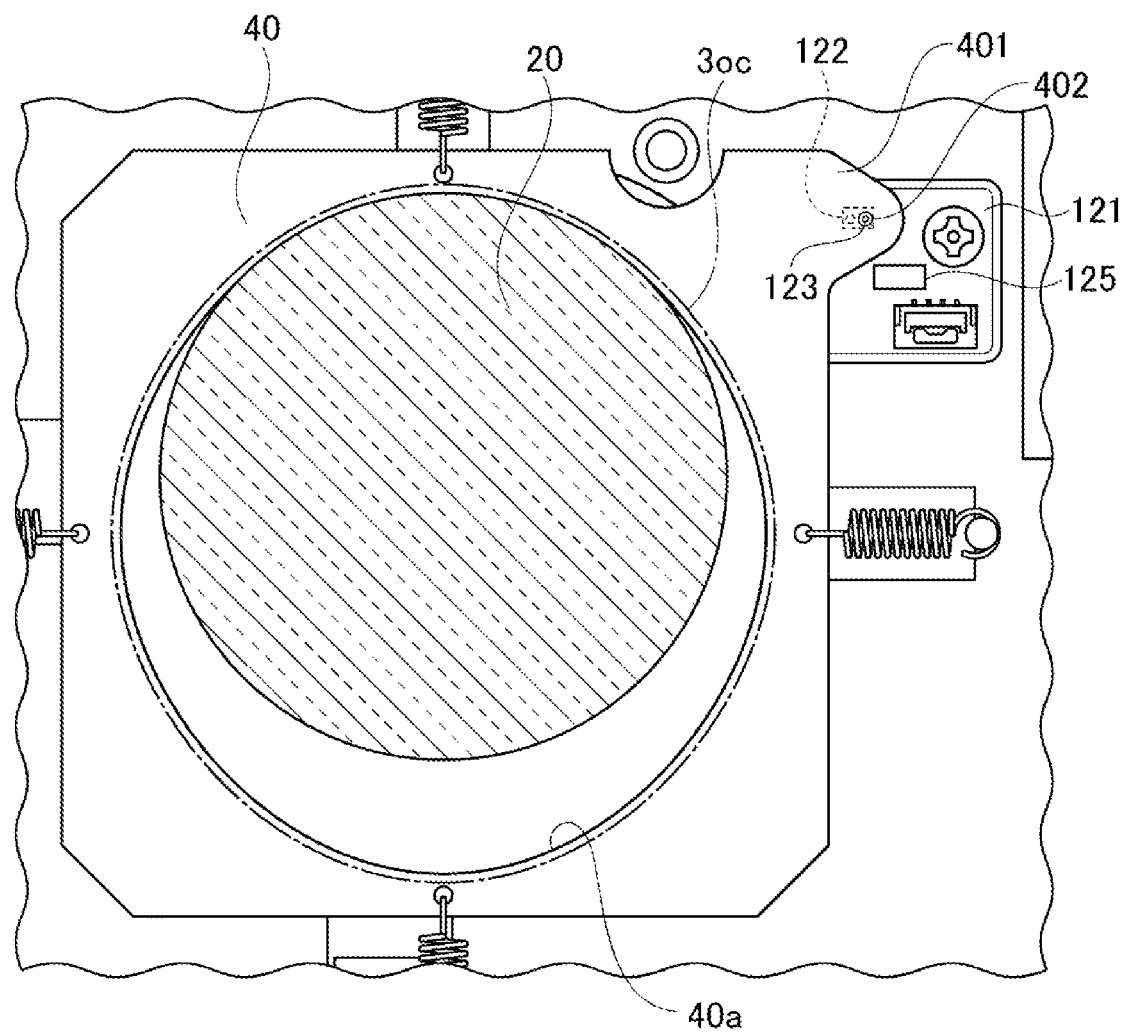
FIG. 15 is a partial plan view illustrating a state in which the projection lens is displaced upward, and the outer surface of the projection lens comes into contact with the shift allowance plate at the upper end of the opening.

Assume that the controller rotates the vertical shift motor 321 to move the vertical stage 32 upward in order to displace the projection lens 20 upward. Then, as shown in FIG. 15, the outer surface 20s of the projection lens 20 comes into contact with the shift allowance plate 40 at the upper end of the opening 40a. In this state, the projection lens 20 is not displaced to the upper limit position. At this time, the light emitting part 123 faces the through hole 402.

Figure 16:
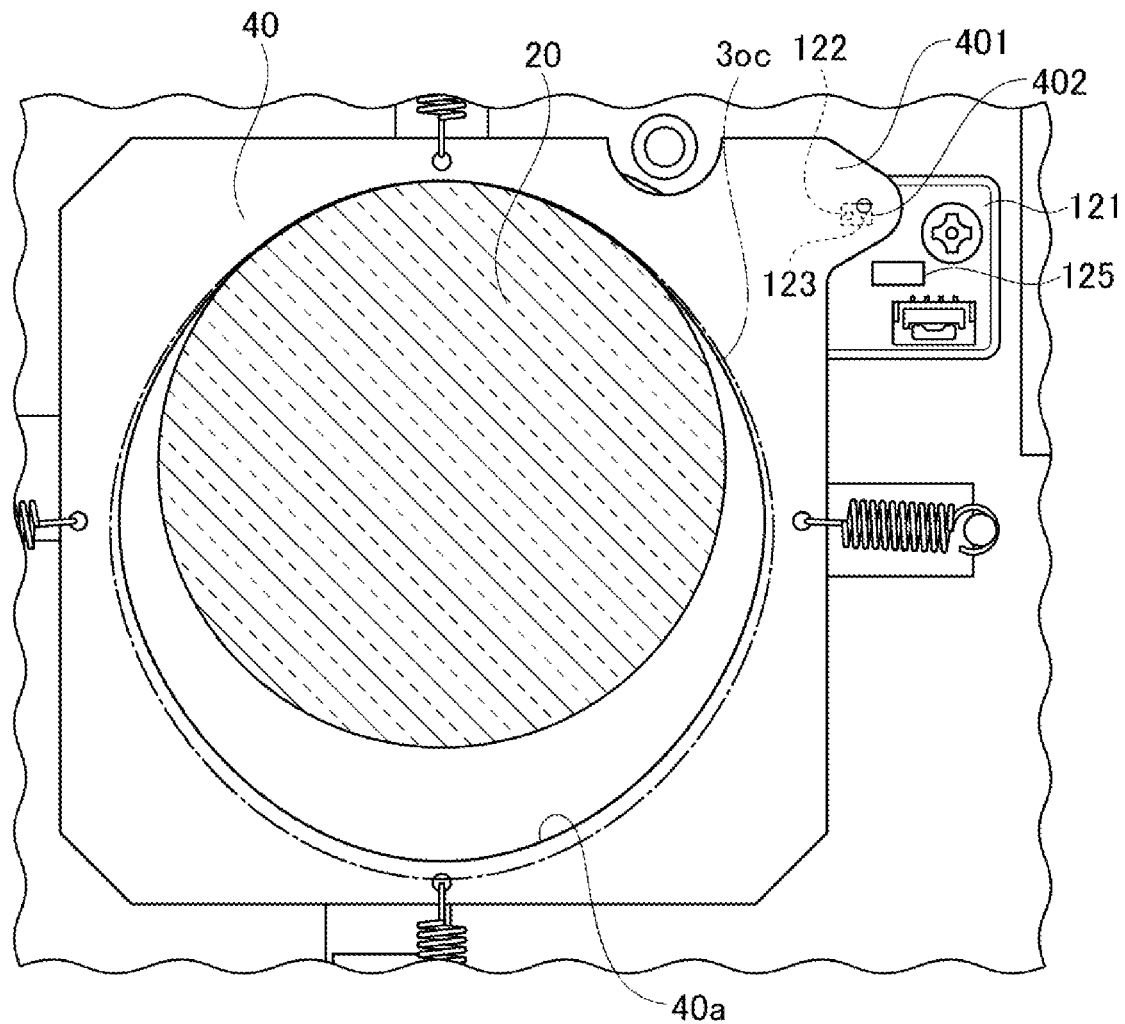
FIG. 16 is a partial plan view illustrating a state in which the projection lens displaced upward pushes and displaces the shift allowance plate in the upward direction.
Figure 17:
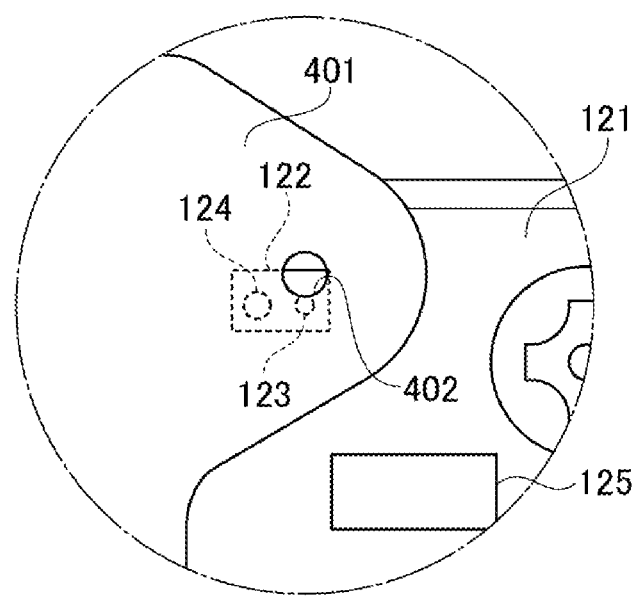
FIG. 17 is a partial enlarged plan view illustrating the positional relationship between the light emitting part and the through hole in the state of FIG. 16.

When the controller further rotates the vertical shift motor 321 to move the vertical stage 32 further upward, the projection lens 20 pushes the shift allowance plate 40 upward to displace it, as shown in FIG. 16. Then, as shown in the partial enlarged plan view of FIG. 17, the through hole 402 is shifted above the light emitting part 123, and the light receiving part 124 receives the light emitted from the light emitting part 123. The detector 125 detects that the shift allowance plate 40 has been displaced to the limit position in any direction by being supplied with a current equal to or greater than the predetermined value from the light receiving part 124.

Figure 18:
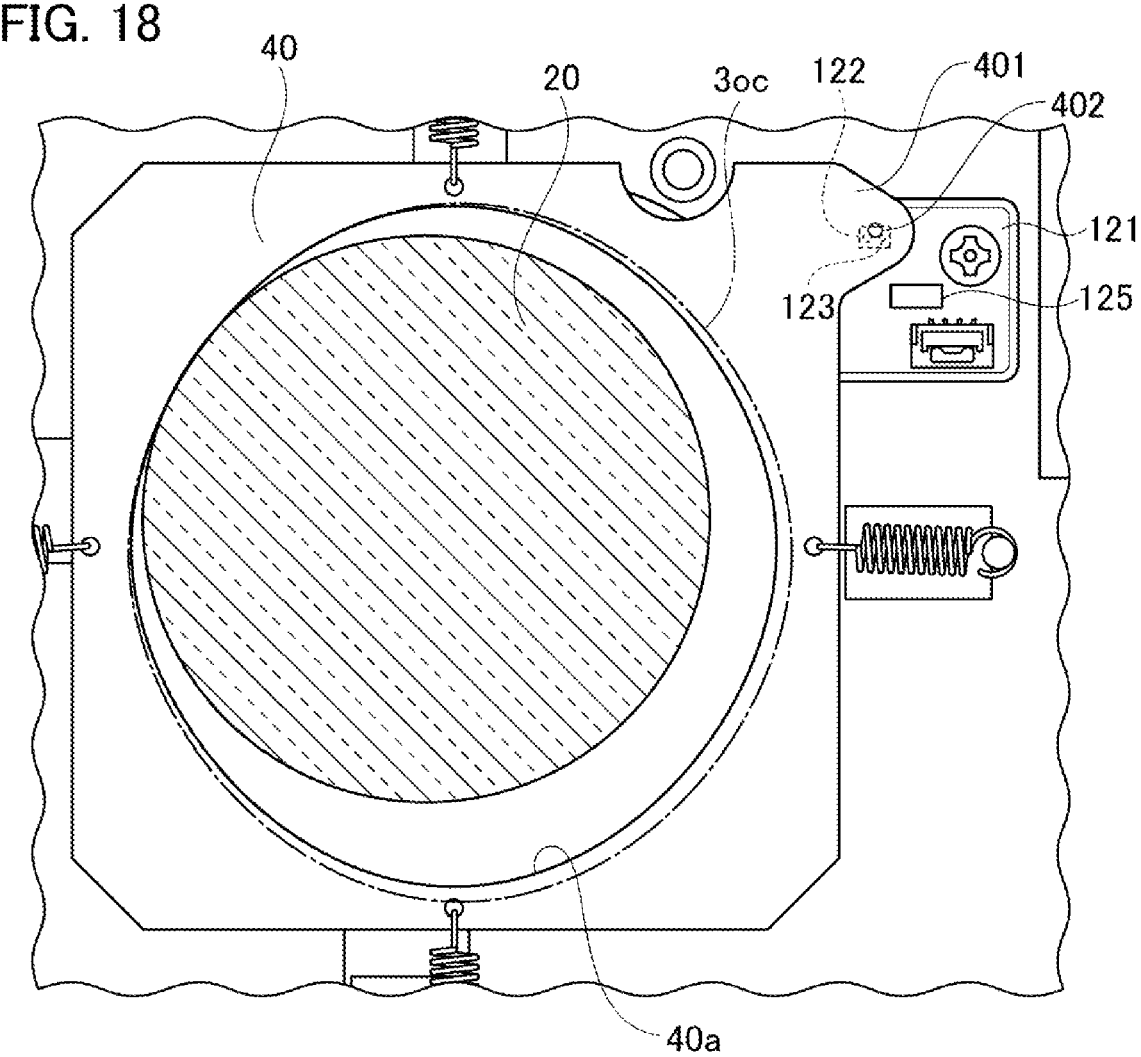
FIG. 18 is a partial plan view illustrating a state in which the projection lens is displaced in the upper left direction, and the projection lens displaced in the upper left direction pushes and displaces the shift allowance plate in the upper left direction.

FIG. 18 shows a state in which the controller moves the horizontal stage 31 and the vertical stage 32 in the upper left direction to displace the projection lens 20 in the upper left direction, and the projection lens 20 pushes and displaces the shift allowance plate 40 in the upper left direction.

Figure 19:
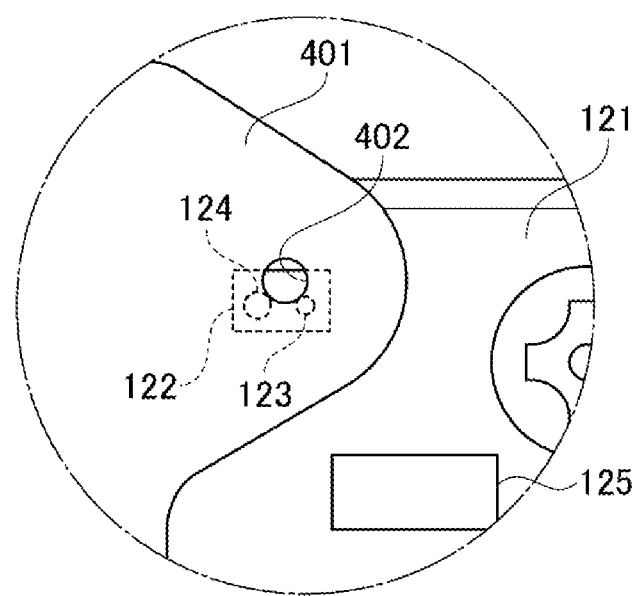
FIG. 19 is a partial enlarged plan view illustrating the positional relationship between the light emitting part and the through hole in the state of FIG. 18.

In this case, as shown in the partial enlarged plan view of FIG. 19, the through hole 402 is shifted to the upper left side of the light emitting part 123, and the light receiving part 124 receives the light emitted from the light emitting part 123. The detector 125 detects that the shift allowance plate 40 has been displaced to the limit position in any direction by being supplied with a current equal to or greater than the predetermined value from the light receiving part 124.

In this way, the controller moves one or both of the horizontal stage 31 and the vertical stage 32 to displace the projection lens 20 in any direction. When the shift allowance plate 40 is displaced after the outer surface 20s of the projection lens 20 comes into contact with the shift allowance plate 40 at any end of the opening 40a, the detector 125 detects that the shift allowance plate 40 has been displaced to the limit position.

When the detector 125 detects that the shift allowance plate 40 has been displaced to the limit position, the controller stops displacement of the projection lens 20. Therefore, the projection lens 20 is not displaced beyond the limit position.

In this way, in accordance with the projector according to one or more embodiments, it is possible to almost certainly prevent the projection lens 20 from being displaced beyond the limit position. Therefore, in accordance with the projector according to one or more embodiments, it is possible to project image light without causing vignetting even if the projection lens 20 is displaced in any direction. In accordance with the projector according to one or more embodiments, a single photosensor (the photoreflector 122) can detect the limit position for the displacement of the projection lens 20 in all circumferential directions. A configuration that almost certainly prevents the projection lens 20 from being displaced beyond the limit position can be realized with an inexpensive and simple configuration In one or more embodiments, the photoreflector 122 is used as a photo sensor, but a photointerrupter may also be used. In the configuration using the photoreflector 122, the light receiving part 124 does not receive the light emitted from the light emitting part 123 and passing through the through hole 402 while the projection lens 20 is not displaced. When the projection lens 20 is displaced to the limit position, the light receiving part 124 receives the light emitted from the light emitting part 123 and reflected by the shift allowance plate 40.

When a photointerrupter is used as a photosensor, the light-emitting part and the light-receiving part are arranged to face each other with the protrusion 401 interposed therebetween. When a photointerrupter is used, the light receiving part receives the light emitted from the light emitting part and passing through the through hole 402 while the projection lens 20 is not displaced. When the projection lens 20 is displaced to the limit position, the light emitted from the light emitting part is blocked by the shift allowance plate 40, and thus the light receiving part does not receive the light emitted from the light emitting part.

It is preferable to use the photoreflector 122 rather than a photointerrupter. If the photoreflector 122 is used, the light emitting part 123 and the light receiving part 124 can be arranged on one side of the protrusion 401, thereby simplifying the configuration.

The present invention is not limited to one or more embodiments described above, and various modifications can be made without departing from the scope of the present invention.

What is claimed is:
1. A projector comprising:
a display element;
a projection lens configured to project image light based on an image displayed on the display element;
a horizontal stage having a first opening into which the projection lens is fitted, and being horizontally movable for horizontally displacing the projection lens fitted in the first opening;
a vertical stage having a second opening into which the projection lens is fitted, and being vertically movable for vertically displacing the projection lens fitted in the second opening;
a photosensor including a light emitting part and a light receiving part;
a shift allowance plate having a third opening that is similar in shape to a shift tolerance of the projection lens and has a size equal to or smaller than the shift tolerance, and having a through hole that allows light emitted from the light emitting part to pass through, the shift tolerance being defined as a range in which the projection lens can be displaced in either a horizontal direction or a vertical direction, or in any direction combining horizontal and vertical directions, without causing vignetting of the image light projected by the projection lens, wherein
the projection lens is arranged in the third opening,
in a state in which the projection lens is not displaced, an entire circumference of an outer surface of the projection lens is not in contact with the shift allowance plate at an end of the third opening, and the light emitting part faces the through hole, the projector further comprises a detector configured to detect that the projection lens has been displaced to a limit position, based on a change from a state in which the light receiving part does not receive light emitted from the light emitting part to a state in which the light receiving part receives light emitted from the light emitting part, or a change from a state in which the light receiving part receives light emitted from the light emitting part to a state in which the light receiving part does not receive light emitted from the light emitting part, when at least one of the horizontal stage and the vertical stage is moved to displace the projection lens in any direction and the outer surface of the projection lens is in contact with the shift allowance plate at the end of the third opening to displace the shift allowance plate.

2. The projector according to claim 1, wherein the photosensor is either a photoreflector in which, in a state in which the projection lens is not displaced, the light receiving part does not receive the light emitted from the light emitting part and having passed through the through hole, and when the projection lens is displaced to the limit position, the light receiving part receives the light emitted from the light emitting part and reflected by the shift allowance plate, or a photointerrupter in which, in a state in which the projection lens is not displaced, the light receiving part receives the light emitted from the light emitting part and having passed through the through hole, and when the projection lens is displaced to the limit position, the light emitted from the light emitting part is blocked by the shift allowance plate and the light receiving part does not receive the light emitted from the light emitting part.

* * * * *